Patented Jan. 4, 1944

2,338,429

UNITED STATES PATENT OFFICE 2,338,429

SYNTHETIC RESIN

Louis A. Gruenwald, New York, N. Y.

No Drawing. Application June 20, 1940,
Serial No. 341,443

5 Claims. (Cl. 260—71)

The present invention relates to processes of hardening, polymerizing and insolubilizing synthetic resins, particularly where acidic catalysts are required, and it particularly relates to the conversion of partially condensed, soluble, fusible resins, which may be referred to as B stage resins to fully condensed, insoluble, infusible resins, which may be referred to as C stage resins.

The present invention is most especially directed to the hardening of films or molded articles of synthetic resin compositions which resin compositions should be maintained in neutral condition before hardening and then rendered acid with a pH of 3 to 6 or preferably 4 to 5 upon hardening.

The present invention will be particularly described in connection with its application to the manufacture of various urea formaldehyde, thiourea formaldehyde, guanidine formaldehyde and similar resins which may be modified by combinations with glycerol, phthalic acid resins or phenolic resins, it is to be understood that it has broad application to other types of resinous materials.

In hardening resins of this type, considerable difficulty has been experienced when the intermediate resin composition is to be acidified before hardening and frequently the final film or molded articles will be of lower quality and will not be properly hardened or polymerized.

It is, therefore, among the objects of the present invention to provide an improved hardening and polymerization process, adapted to resins from combinations of aldehydes and amino or amido organic compounds, particularly urea and formaldehyde.

Another object is to provide an improved finishing process in which the resin reaction mixture may be suitably controlled so as to have a neutral or substantially neutral pH before hardening or insolubilizing and during shipping or storage and which may readily be given an acid pH upon subsequent insolubilizing or hardening treatments without the need of adding acid catalysts.

Still further objects and advantages will appear from the more detailed description set forth below, it being understood, however, that this more detailed description is given by way of illustration, since various changes therein may be made by those skilled in the art without departing from the scope and spirit of the invention.

It has been found that the above objects may be most satisfactorily accomplished by adding to the unhardened or B-stage resin mixtures, ethyl ammonium phosphate, which upon a subsequent heat treatment may be converted into an acid condition, and which will render the resin sufficiently acid to be readily converted into its final hardened C-stage without rendering the resinous mixture so acid as to cause any substantial deterioration of the resin film.

Moreover, the ethyl ammonium phosphate is neutral in its reaction and does not change the pH of the intermediate resinous composition prior to the heat treatment and it is soluble and miscible in the resin mixture and in organic solvents or oils forming the base of the varnish, paint or lacquer carrying the intermediate resin.

The phosphoric acid is non-volatile and will remain behind at low baking temperatures of 100 to 150° C., while the ammonium will be volatilized away from the ester or phosphoric salt.

It is found that the acidity of the ester which is left after the ammonium has been driven off, will be much better controlled in respect to the amount of acidity, which is desired in the resin film than with other polybasic acid compounds. However, in lieu of the ammonium, it is possible to use other volatile nitrogen bases, such as the alkylamines.

In lieu of the ethyl group which is preferred, it is also possible to use other low molecular weight alkyl groups, such as methyl, propyl or butyl.

In lieu of phosphoric acid, it is also possible to use pyrophosphoric or other polyphosphoric acids.

Either mono-ethyl diammonium phosphate or di-ethyl mono-ammonium phosphate when included in amounts ranging from 0.1 to 2% are not only readily miscible in the resin mixture, but also will not materially change the desired neutral pH of about 7 during the initial stages of formation of the resin or shipment or storage.

On the other hand, as soon as the resin is applied in film form or otherwise formed, and is subjected to an elevated temperature above 212° F. or 100° C., the ammonium or substituted ammonium will be removed, rendering the resinous mixture sufficiently acid so that a most satisfactory hardened resin will be produced in a short time. Both the ammonium radical as well as the substituted ammonium radical are included by the expression "amine."

During the storage period and before the heating, the neutral point will be accurately maintained and the ethyl ammonium phosphate will not tend to decompose even though the resinous mixture be stored over a considerable length of time.

In one instance it was found that as small as ½% of the ethyl ammonium phosphate was sufficient not only to produce a better hardened film, but to reduce the hardening of a film, for example, 0.005 inch thick, within a time of less than 2 minutes, while ordinarily such a film could not be well hardened without being heated for 10 to 15 minutes. With phenol-formaldehyde resins, the thermally decomposable catalyst is preferably added to the resin mixture in the soluble or "resol" stage.

The ethyl ammonium phosphates may not only be added to the lacquers or varnish solutions containing the urea formaldehyde or similar condensation products, but they may also be added to aqueous solutions or emulsions of such resins, useful, for example, in slip-proofing, crush-proofing or finishing textiles. They may also be introduced directly into molding powders with the resinous material or with the filler.

The ethyl ammonium phosphate may be mixed with resins to be impregnated upon paper or cloth or the papers or cloth may be successively impregnated with the phosphates and the resinous materials in either order.

As many changes could be made in the compounds and methods, and many apparently widely different embodiments of this invention could be made without departing from the scope thereof, it is intended that all matter contained in the above description shall be interpreted as illustrative and not in a limiting sense.

What is claimed is:

1. A process of forming insoluble films from urea formaldehyde resins, which comprises forming an initial urea formaldehyde condensation product, adding to said condensation product an ammonium salt of ethyl phosphoric acid ester, and then heating.

2. A process of forming insoluble films from urea formaldehyde resins, which comprises forming an initial urea formaldehyde condensation product, adding to said condensation product diethyl ammonium phosphate and then heating.

3. A process of forming insoluble films from urea formaldehyde resins, which comprises forming an initial urea formaldehyde condensation product, adding to said condensation product diethyl ammonium phosphate and then heating, said ester being added in quantities varying from 0.1 to 2%.

4. A molding powder comprising a powdered soluble fusible urea formaldehyde resin and an ammonium salt of ethyl phosphate.

5. A molding powder comprising a powdered soluble fusible urea formaldehyde resin and an ammonium salt of diethyl phosphate.

LOUIS A. GRUENWALD.